J. BAAS.
NUT LOCK.
APPLICATION FILED AUG. 2, 1915.
1,261,002. Patented Apr. 2, 1918.
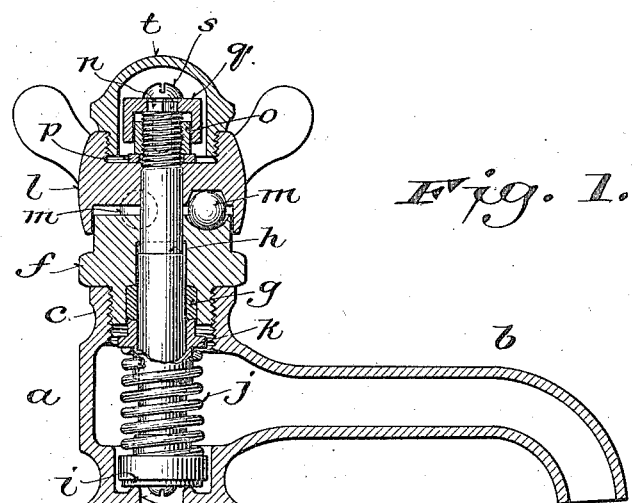
Fig. 1.
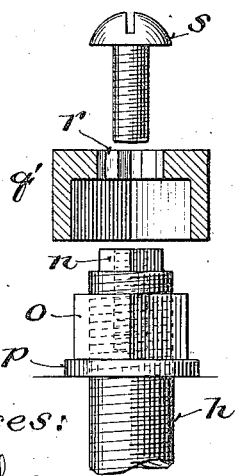
Fig. 2. Fig. 3.
Fig. 5.
Fig. 4.
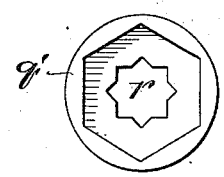
Fig. 6.
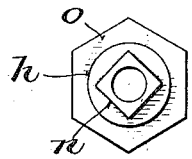
Witnesses:
Fred Palm
Chas. L. Goss
Inventor:
John Baas,
By Flanders Bottum Fawsett & Bottum
Attorneys.

UNITED STATES PATENT OFFICE.

JOHN BAAS, OF MILWAUKEE, WISCONSIN.

NUT-LOCK.

1,261,002.  Specification of Letters Patent.  Patented Apr. 2, 1918.

Application filed August 2, 1915. Serial No. 43,092.

*To all whom it may concern:*

Be it known that I, JOHN BAAS, a citizen of the United States, residing at Milwaukee, in the county of Milwaukee and State of Wisconsin, have invented certain new and useful Improvements in Nut-Locks, of which the following is a specification, reference being had to the accompanying drawing, forming a part thereof.

The main objects of this invention are to provide for the fine adjustment and locking of a nut on a threaded bolt or stem for various purposes such as adjusting the lift or opening movement of a self closing valve to compensate for wear or to vary the extreme opening of the valve; to facilitate such adjustment; to prevent accidental or unauthorized change of such adjustment; and generally to improve the construction and operation of devices of this class.

It consists in the construction, arrangement and combination of parts as hereinafter particularly described and pointed out in the claims.

In the accompanying drawing like characters designate the same parts in the several figures.

Figure 1 is an axial section of a self-closing faucet embodying the invention; Fig. 2 is an enlarged inverted plan view of the locking piece; Fig. 3 is a section of the locking piece on the line 3—3, Fig. 2; Fig. 4 is a section similar to Fig. 3 of a modified form of the locking piece with associated parts shown in elevation; Fig. 5 is an inverted plan view of the locking piece shown in Fig. 4; and Fig. 6 is a top plan view of the valve stem and lifting nut.

Referring to Fig. 1, $a$ designates the body of a self-closing faucet of the usual or any suitable construction, having a laterally projecting spout or nozzle $b$, an internally threaded neck $c$ at the upper end, an externally threaded tubular extension $d$ at the lower end for attachment to a basin slab or the like, and for connection with a pipe, and a valve seat $e$, between the spout $b$ and extension $d$. The particular form and construction of the valve body are however, immaterial, so far as the present invention is concerned, and may be varied as desired.

A cap or plug $f$, is threaded in the neck $c$ and closes the valve chamber above the spout $b$. It is recessed in the under side to receive packing $g$, for the stem $h$ of the valve, which passes upwardly through and is guided in a central opening in the cap or plug. At its lower end the stem $h$ is provided with a valve $i$, of the usual or any suitable construction, which is normally closed and held against the seat $e$ by a spring $j$ surrounding the stem within the valve chamber and bearing at its ends against the valve and against a gland $k$, which in turn presses against and confines the packing $g$ in the recess or stuffing box of the cap $f$.

A handle $l$, of the ordinary or any suitable construction, is rotatably mounted on the stem $h$ above the cap $f$. The hub of the handle and the cap are formed in the usual manner with opposing reversely inclined ball races, in which balls $m$ are inserted for lifting or opening the valve by turning the handle in either direction. The hub of the handle is recessed in the under side to fit over the upper cylindrical end of the cap $f$ and close the space between it and the handle. The upper end of the stem $h$ which projects above the hub of the handle, is formed with a reduced polygonal, preferably square portion $n$, below or adjacent to which it is threaded to receive a polygonal, preferably plain hexagonal lifting nut $o$. Between the nut $o$ and the handle, a washer $p$ is preferably interposed.

A locking piece $q$, formed as shown in Figs. 2 and 3, with a polygonal opening $r$, fitting the reduced polygonal end $n$ of the stem, has one or more depending wings or projections adapted by engagement with one or more of the flat faces of the nut $o$, as shown in Fig. 1, to hold the nut in adjusted position on the stem. The locking piece is fastened on the squared or polygonal end $n$ of the stem by a headed screw $s$, which is tapped or threaded in an axial hole in the stem. The opening $r$ in the locking piece is preferably made of octagonal starlike form, as shown in Fig. 2, so that the angular adjustment of the locking piece relative to the stem may be changed by intervals of 45 degrees, and with the hexagonal lifting nut $o$, the adjustment of the nut may be varied by intervals of 7½ degrees. The hub of the handle $l$ is recessed and internally threaded in the upper side to receive a hollow cap $t$, which normally covers and protects the upper end of the valve stem, preventing accidental or unauthorized change in the adjustment of the nut $o$ and locking piece $q$, and giving a finished appearance to the faucet.

In place of one or more separate wings or projections for engagement with the nut $o$, a locking piece $q'$ may be formed, as shown in Figs. 4 and 5, with a continuous depending marginal flange to fit over and completely surround the nut.

To adjust the lifting nut $o$ for varying the lift or opening of the valve $i$, the cap $t$ is removed, thereby exposing the screw $s$ and locking piece $q$. The screw $s$ and the locking piece $q$ are then removed from the stem and the nut $o$ is turned down or up to increase or reduce the lift of the valve as desired. After the proper adjustment of the nut has been made, the locking piece is replaced on the nut and the squared or polygonal portion $n$ of the stem and the screw $s$ is reinserted in the stem and its head turned tightly down against the top of the locking piece, to securely hold it with the nut in adjusted position. With a lifting nut of hexagonal form, a valve stem having a squared end and a locking piece having an octagonal opening fitting the squared end of the stem in different angular positions, a fine adjustment can be made, an adjustment which cannot be affected by the ordinary operation of the faucet and which, when the protecting cap $t$ is in place, is not liable to accidental or unauthorized change.

Various modifications in minor details of construction may be made without departure from the principle and scope of the invention as defined in the following claims.

I claim:

1. In a nut lock the combination with a stem having a reduced square end and a plain hexagonal nut threaded on the stem adjacent to its square end, of a locking piece fitting over and adapted to engage the nut in different angular relations thereto and having an octagonal starlike opening fitting over and adapted to engage the square end of the stem in different angular relations thereto.

2. In a nut lock the combination with a stem having a reduced square end and a plain hexagonal nut threaded on the stem adjacent to its square end, of a locking piece fitting over and adapted to engage the nut in different angular relations thereto and having an octagonal starlike opening fitting over and adapted to engage the square end of the stem in different angular relations thereto, and a locking screw threaded axially in the square end of the stem and having a head adapted to overhang the same and to hold the locking piece in place thereon.

In witness whereof I hereto affix my signature in presence of two witnesses.

JOHN BAAS.

Witnesses:
G. DRONGENBERG,
EDW. F. HIRDECKER.

Copies of this patent may be obtained for five cents each, by addressing the "Commissioner of Patents, Washington, D. C."